(12) United States Patent
Zhao et al.

(10) Patent No.: US 12,212,254 B1
(45) Date of Patent: Jan. 28, 2025

(54) FLUX-WEAKENING CONTROL METHOD AND SYSTEM FOR SALIENT POLE OFFSET PERMANENT MAGNET SYNCHRONOUS MOTOR

(71) Applicant: Shandong University, Jinan (CN)

(72) Inventors: Wenliang Zhao, Jinan (CN); Ning Wang, Jinan (CN); Chengwu Diao, Jinan (CN); Gefei Zhu, Jinan (CN); Xiuhe Wang, Jinan (CN)

(73) Assignee: Shandong University, Jinan (CN)

( * ) Notice: Subject to any disclaimer, the term of this patent is extended or adjusted under 35 U.S.C. 154(b) by 0 days.

(21) Appl. No.: 18/915,421

(22) Filed: Oct. 15, 2024

(30) Foreign Application Priority Data

Nov. 23, 2023 (CN) .......................... 202311578686.8

(51) Int. Cl.
*H02P 21/02* (2006.01)
*H02P 21/00* (2016.01)
*H02P 21/22* (2016.01)

(52) U.S. Cl.
CPC .......... *H02P 21/0089* (2013.01); *H02P 21/22* (2016.02); *H02P 2207/05* (2013.01)

(58) Field of Classification Search
CPC .. H02P 21/0089; H02P 21/22; H02P 2207/05; H02P 21/02; H02P 21/141
See application file for complete search history.

(56) References Cited

U.S. PATENT DOCUMENTS

| 2008/0224651 A1* | 9/2008 | Schulz | H02P 21/02 |
| | | | 318/812 |
| 2023/0361702 A1* | 11/2023 | Zhang | H02P 21/141 |

FOREIGN PATENT DOCUMENTS

| CN | 103916058 A | 7/2014 |
| CN | 107395085 A | 11/2017 |

(Continued)

OTHER PUBLICATIONS

Gefei Zhu, et al., Control System for a Novel Dual-Rotor Permanent Magnet Synchronous Reluctance Motor Considering Torque Superposition, 25th International Conference on Electrical Machines and Systems, IEEE, 2022, pp. 1-5.

(Continued)

*Primary Examiner* — Cortez M Cook
(74) *Attorney, Agent, or Firm* — Bayramoglu Law Offices LLC

(57) ABSTRACT

The provided is flux-weakening control method and system for the salient pole offset permanent magnet synchronous motor. The method includes determining the given value of electromagnetic torque according to the actual speed and the given target speed; calculating the current trajectories of MTPA and MTPV in dq coordinate system; obtaining the d'q' coordinate system by rotating the coordinate system, and calculating the current trajectory of MTPA and MTPV in the d'q' coordinate system to obtain the characteristic current; judging whether it is necessary to turn on the flux-weakening control, and outputting the direct axis current compensation when it turns on; judging the flux-weakening area of the motor; and generating the space vector pulse width modulation signal to drive the motor to realize the full speed range flux-weakening speed regulation of the salient pole offset permanent magnet synchronous motor.

7 Claims, 10 Drawing Sheets

(56) References Cited

FOREIGN PATENT DOCUMENTS

CN 109873590 A 6/2019
WO WO-2016079791 A1 * 5/2016

OTHER PUBLICATIONS

Wang Xu-Bin, The Key Control Technologies of IPMSM Speed Regulation System in Vehicle, Technoiacl Communication, 2020, pp. 50-52, vol. 7.

* cited by examiner

FLUX-WEAKENING CONTROL METHOD AND SYSTEM FOR SALIENT POLE OFFSET PERMANENT MAGNET SYNCHRONOUS MOTOR

CROSS-REFERENCE TO THE RELATED APPLICATIONS

This application is based upon and claims priority to Chinese Patent Application No. 202311578686.8, filed on Nov. 23, 2023, the entire contents of which are incorporated herein by reference.

TECHNICAL FIELD

The invention belongs to the technical field of motor drive, and specifically relates to a flux-weakening control method and system for a salient pole offset permanent magnet synchronous motor.

BACKGROUND

The statement in this part only provides background technical information related to the invention, which does not necessarily constitute prior technology.

By changing the magnetic circuit of the motor, the salient pole offset permanent magnet synchronous motor makes the current phase angle corresponding to the maximum permanent magnet torque close to the current phase angle corresponding to the maximum reluctance torque (the current phase angle corresponding to the maximum permanent magnet torque of the traditional permanent magnet synchronous motor is 45° different from the current phase angle corresponding to the maximum reluctance torque), so as to realize the full superposition of permanent magnet torque and reluctance torque, thus improving the power density of the motor. At the same time, the special rotor topology of the salient pole offset permanent magnet synchronous motor makes the relative position of the quadrature axis (q axis), the direct axis (d axis), and the permanent magnet flux linkage of the motor change, the direct axis position, and the permanent magnet flux linkage position differ by about 45° electrical angle (the direct axis position of the traditional permanent magnet synchronous motor coincides with the permanent magnet flux linkage position), which makes the mathematical model of the salient pole offset permanent magnet synchronous motor different from the traditional motor, so it is necessary to design different control systems.

On the other hand, the flux-weakening control method of the traditional permanent magnet synchronous motor has been developed quite mature, by injecting the direct axis flux-weakening current, the speed range of the traditional permanent magnet synchronous motor is greatly broadened. However, the special mathematical model of salient pole offset permanent magnet synchronous motor makes its voltage limit ellipse, maximum torque per ampere control (MTPA), maximum torque per voltage control (MTPV), and other formulas change compared with traditional permanent magnet synchronous motor, which leads to the poor effect of flux-weakening control method suitable for traditional permanent magnet synchronous motor when applied to salient pole offset permanent magnet synchronous motor.

SUMMARY

In order to solve the above problems, the invention proposes a flux-weakening control method and system for a salient pole offset permanent magnet synchronous motor, this invention fully considers the asymmetric topology and torque superposition advantages of salient pole offset permanent magnet synchronous motor, the maximum torque output of salient pole offset permanent magnet synchronous motor is realized, and the speed range of salient pole offset permanent magnet synchronous motor is greatly broadened.

According to some embodiments, the first solution of the invention discloses a flux-weakening control method for a salient pole offset permanent magnet synchronous motor, and adopts the following technical solution:

A flux-weakening control method for a salient pole offset permanent magnet synchronous motor, including:
- according to an actual speed of the salient pole offset permanent magnet synchronous motor and a given target speed, determining a given value of an electromagnetic torque;
- according to an electromagnetic torque equation and the given value of the electromagnetic torque of the salient pole offset permanent magnet synchronous motor, calculating a current trajectory and a given value of the motor current when a maximum torque per ampere control is operating in a dq coordinate system;
- according to a stator voltage equation of the salient pole offset permanent magnet synchronous motor, calculating the current trajectory when a maximum torque per voltage control is operating in the dq coordinate system;
- through a rotation transformation of the coordinate system, rotating the dq coordinate system of the salient pole offset permanent magnet synchronous motor by a certain angle to obtain a new d'q' coordinate system, and calculating the current trajectory and the given value of the motor current in the d'q' coordinate system;
- according to the current trajectory when the maximum torque per voltage control is operating in the d'q' coordinate system, obtaining a characteristic current and a quadrature axis current at the characteristic current;
- according to a difference between a limit voltage of an inverter and a given value of the stator voltage, judging whether the flux-weakening control needs to be turned on, when the flux-weakening control is turned on, outputting a direct axis current compensation by the proportional integral (PI) controller, a sum of a given value of the direct axis current and a compensation amount of the direct axis current when a maximum torque per ampere control is operating is a given value of the direct axis current in a first flux-weakening region, and an upper limit of an amplitude is not greater than the amplitude of the characteristic current;
- according to the difference between the amplitude of the sum of the given value of the direct axis current and the compensation amount of the direct axis current and the amplitude of the characteristic current when the maximum torque per ampere control is operating, judging a flux-weakening region of the motor, and determining an output of a compensation amount of a quadrature axis current through a PI controller when the motor works in a second flux-weakening region;
- when the first flux-weakening region is operating, the quadrature axis current of the motor is given by the motor current limit circle;
- when the second flux-weakening region is operating, the given value of the direct axis current of the motor is the characteristic current, and the given value of the quadrature axis current of the motor is the sum of the quadrature axis current at the characteristic current and the compensation amount of the quadrature axis current;

through the rotation transformation of the coordinate system, rotating the current d'q' coordinate system of the salient pole offset permanent magnet synchronous motor to a corresponding angle to obtain an original dq coordinate system, and obtaining the given value of the motor current in the dq coordinate system;

according to the given value of the motor current and an obtained actual value of the current, generating a space vector pulse width modulation signal to drive an operation of the salient pole offset permanent magnet synchronous motor, and realizing a flux-weakening speed regulation of the salient pole offset permanent magnet synchronous motor in the full speed range.

As a further technical limitation, the current trajectory when the maximum torque per voltage control is operating is approximately a straight line with a slope of k.

As a further technical limitation, the rotation transformation of the coordinate system is to rotate the current dq coordinate system of the salient pole offset permanent magnet synchronous motor by a certain angle θ to obtain a new d'q' coordinate system, so that the current trajectory in the d'q' coordinate system when the maximum torque per voltage control is operating is perpendicular to an abscissa axis (that is, the d' coordinate axis), then given values of the current ($i_d^*$, $i_q^*$) in the dq coordinate system when the maximum torque per ampere control is operating can be expressed as ($i_{d'}^*$, $i_{q'}^*$) in the d'q' coordinate system after the rotation transformation of the coordinate system, that is, $$\begin{cases} i_{d'}^* = i_d^* \cos\theta + i_q^* \sin\theta \\ i_{q'}^* = -i_d^* \sin\theta + i_q^* \cos\theta \end{cases}$$

As a further technical limitation, the direct axis current at an intersection of the current trajectory and the abscissa axis (that is, the d' coordinate axis) in the d'q' coordinate system is the characteristic current $i_c$, and the quadrature axis current at the intersection of the current trajectory and the current limit circle in the d'q' coordinate system is the quadrature axis current $i_{cq}$ at the characteristic current.

As a further technical limitation, according to the difference between the amplitude $|i_{d'}^{}|$ of the sum of the given value of the direct axis current and the compensation amount of the direct axis current and the amplitude $|i_c|$ of the characteristic current when the maximum torque per ampere control is operating, the flux-weakening region of the motor is judged; when $|i_{d'}^{}|$ is less than or equal to $|i_c|$, the motor works in the first flux-weakening region, when $|i_{d'}^{**}|$ is greater than $|i_c|$, the motor works in the second flux-weakening region.

Furthermore, when $|i_{d'}^{**}|$ is less than or equal to $|i_c|$, the motor works in the first flux-weakening region, an upper limit of the amplitude of the sum of the given value of the direct axis current $i_{d'}^*$ and the compensation amount of the direct axis current $i_{d'fw}^*$ is set as the amplitude of the characteristic current $i_c$ to obtain the given value of the direct axis current $i_{d'}^{*}$ in the first flux-weakening region, then the given value of the direct axis current $i_{d'}^{*}$ in the first flux-weakening region can be expressed as $$i_{d'}^{} = \begin{cases} i_{d'}^{} = i_{d'}^* + i_{d'fw}^*, & |i_{d'}^{}| \le |i_c| \\ i_c, & |i_{d'}^{}| > |i_c| \end{cases};$$

if the quadrature axis current in the first flux-weakening region is given by the motor current limit circle, then the given value of the quadrature axis current in the first flux-weakening region $i_q^{}$ can be expressed as $$i_{q'}^{} = \begin{cases} i_{q'}^*, & i_{q'}^{*2} + i_{d'}^{*2} \le i_{s\,max}^2 \\ \sqrt{i_{s\,max}^2 - i_{d'}^{*2}}, & i_{q'}^{*2} + i_{d'}^{***2} > i_{s\,max}^2, \end{cases}$$

where $i_{smax}$ is a limit current of the motor, and $i_{q'}^*$ is the given value of the quadrature axis current when the maximum torque per ampere control is operating.

Furthermore, when $|i_{d'}^{**}|$ is greater than $|i_c|$, the motor works in the second flux-weakening region, at this time, the compensation amount of the quadrature axis current $i_{q'fw}^*$ is output through the PI controller, the given value of the direct axis current in the second flux-weakening region is equal to the characteristic current, the given value of the quadrature axis current in the second flux-weakening region $i_{q'}^{***}$ is the sum of the quadrature axis current $i_{cq}$ at the characteristic current and the compensation amount of the quadrature axis current $i_{q'fw}^*$.

Furthermore, in a full speed range, the given values $i_{d'}^{*}$ and $i_{q'}^{*}$ of the quadrature axis current and direct axis current of the motor in the d'q' coordinate system can be expressed $$\text{as} \begin{cases} i_{d'}^*, & \text{MTPA region} \\ i_{d'}^{***} = i_{d'}^* + i_{d'fw}^*, & \text{first flux-weakening region} \\ i_c, & \text{second flux-weakening region} \\ i_{q'}^*, & \text{MTPA region} \\ i_{q'}^{*} = \sqrt{i_{smax}^2 - i_{d'}^{*2}}, & \text{first flux-weakening region} \\ i_{q'fw}^* + i_{cq}, & \text{second flux-weakening region} \end{cases}.$$

Furthermore, through the rotation transformation of the coordinate system, the current d'q' coordinate system of the salient pole offset permanent magnet synchronous motor is rotated to a corresponding angle −θ to obtain the original dq coordinate system, and the $i_{q'}^{**}$ and $i_{d'}^{*}$ are transformed into the given values of quadrature axis current $i_q^{}$ and direct axis current $i_d^{}$ in the dq coordinate system, that is:

$$\begin{cases} i_d^{} = i_{d'}^{}\cos(-\theta) + i_{q'}^{}\sin(-\theta) \\ i_q^{} = -i_{d'}^{}\sin(-\theta) + i_{q'}^{}\cos(-\theta) \end{cases}$$

According to some embodiments, the second solution of the invention provides a flux-weakening control system for the salient pole offset permanent magnet synchronous motor, which adopts the following technical solution:

A flux-weakening control system for salient pole offset permanent magnet synchronous motor, including:

an electromagnetic torque given module, the electromagnetic torque given module is configured to obtain a real-time speed of the salient pole offset permanent magnet synchronous motor, combined with a given speed of the motor, the given value of the electromagnetic torque of the motor is obtained;

a maximum torque per ampere control module, the maximum torque per ampere control module is configured to calculate the given values of the quadrature axis current and direct axis current of the motor when the maximum torque per ampere control is operating according to the electromagnetic torque equation and the given value of the electromagnetic torque;

a dq coordinate system-d'q' coordinate system transformation module, the dq coordinate system-d'q' coordinate system transformation module is configured to transform the given value of the current in the dq coordinate system into the given value of the current in the d'q' coordinate system;

a maximum torque per voltage control module, the maximum torque per voltage control module is configured to calculate the current trajectory of the motor when the maximum torque per voltage control is operating according to the stator voltage equation, according to a calculation result of the dq coordinate system-d'q' coordinate system transformation module and the current trajectory when the maximum torque per voltage control is operating, the characteristic current and the quadrature axis current at the characteristic current are obtained;

a direct axis current compensation module, the direct axis current compensation module is configured to determine whether the flux-weakening control needs to be turned on according to the difference between the limit voltage of the inverter and the given value of the stator voltage, and output the compensation amount of the direct axis current when it is turned on, according to the calculation result of the dq coordinate system-d'q' coordinate system transformation module and the compensation amount of the direct axis current, the given value of the current of the salient pole offset permanent magnet synchronous motor operating in the first flux-weakening region is calculated;

a quadrature axis current compensation module, the quadrature axis current compensation module is configured to determine whether it is necessary to turn on the second flux-weakening region according to the difference between the amplitude of the sum of the given value of the direct axis current and the compensation amount of the direct axis current and the amplitude of the characteristic current when the maximum torque per ampere control is operating, and output the compensation amount of the quadrature axis current when turning on, according to the calculation result of the direct axis current compensation module, the quadrature axis current at the characteristic current and the compensation amount of the quadrature axis current, the given value of the current of the salient pole offset permanent magnet synchronous motor operating in the second flux-weakening region is calculated;

a d'q' coordinate system-dq coordinate system transformation module, the d'q' coordinate system-dq coordinate system transformation module is configured to transform the given value of the current in the d'q' coordinate system into the given value of the current in the dq coordinate system;

a space vector pulse width modulation module, the space vector pulse width modulation module is configured to generate a space vector pulse width modulation signal according to the given value of the motor current and an obtained actual value of the current, the space vector pulse width modulation module is used to drive the operation of the salient pole offset permanent magnet synchronous motor, complete the flux-weakening control of the salient pole offset permanent magnet synchronous motor, and realize the flux-weakening speed regulation of the salient pole offset permanent magnet synchronous motor in the full speed range.

Compared with the prior art, the beneficial effects of the invention are as follows:

The flux-weakening control system proposed in the invention always considers the special topology of the salient pole offset permanent magnet synchronous motor. The MTPA control operation mode and the flux-weakening control operation mode adopted in the invention all realize the maximum torque output of the salient pole offset permanent magnet synchronous motor as much as possible; the invention uses the rotation transformation of the coordinate system to rotate the current trajectory of the motor in the dq coordinate system to the d'q' coordinate system, according to the direct axis flux-weakening current and the characteristic current in the d'q' coordinate system, the motor operation is divided into the first flux-weakening region control and the second flux-weakening region control, and the flux-weakening speed regulation of the salient pole offset permanent magnet synchronous motor in full speed range is realized; the MTPV control current trajectory used in the invention is approximated as a straight line, and in the proposed d'q' coordinate system, it is a straight line perpendicular to the abscissa axis (that is, the d' coordinate axis), which reduces the amount of calculation and improves the operating speed of the system.

The additional advantages of the invention will be given in part in the description below, and part will become apparent from the description below, or learned through the practice of the invention.

BRIEF DESCRIPTION OF THE DRAWINGS

The specification drawings that form part of the invention are used to provide a further understanding of the invention, and the schematic embodiments and descriptions of the invention are used to explain the invention, which does not constitute an improper limitation of the invention.

DETAILED DESCRIPTION OF THE EMBODIMENTS

The following is a further explanation of the invention in combination with drawings and embodiments.

It should be noted that the following details are illustrative and are intended to provide further explanation for this application. Unless otherwise specified, all technical and scientific terms used herein have the same meaning as those commonly understood by ordinary technicians in the technical field to which this application relates.

It should be noted that the terminology used here only describes the specific embodiment, not intended to limit the embodiment according to the exemplary embodiment of the invention. As used here, the singular form is also intended to include the plural form unless explicitly stated in the context. In addition, it should be understood that when the terms include and/or comprise are used in this specification, they indicate the presence of features, steps, operations, devices, amounts, and/or combinations of them.

In this invention, terms such as up, down, left, right, front, back, vertical, horizontal, side, and bottom indicate the position or position relationship based on the position or position relationship shown in the attached figures, which is only a relation word determined to facilitate the description of the structural relationship of each amount or amounts of the invention. It does not refer to any amount or amount in the invention and cannot be understood as a restriction on the invention.

In this invention, terms such as 'fixed connection', 'connected', 'connecting', etc. should be understood in a broad sense, indicating that it can be a fixed connection, an integrated connection, or a detachable connection; it can be directly connected or indirectly connected through an intermediate medium. For the relevant scientific research or technical personnel in this field, the specific meaning of the above terms in the actual invention can be determined according to the specific situation, which cannot be understood as a restriction on the invention.

Without conflicts, the embodiments and the characteristics of the embodiments in the invention can be combined.

Embodiment 1

The embodiment of the invention introduces a flux-weakening control method for the salient pole offset permanent magnet synchronous motor.

Figure 1:
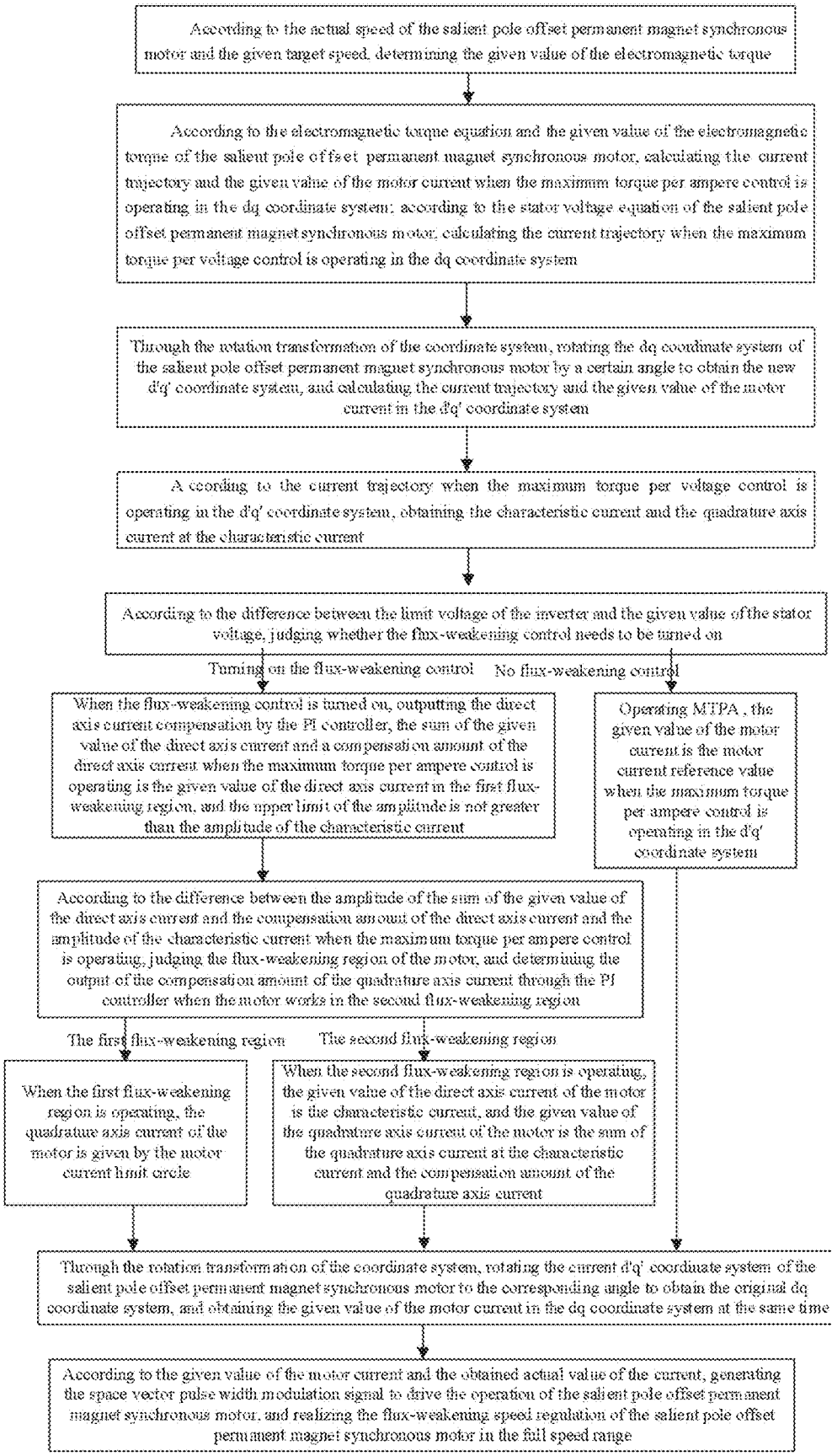
FIG. 1 is a flowchart of the flux-weakening control method for the salient pole offset permanent magnet synchronous motor in Embodiment 1 of the invention.

A flux-weakening control method for the salient pole offset permanent magnet synchronous motor is shown in FIG. 1, which includes:

According to the actual speed of the salient pole offset permanent magnet synchronous motor and the given target speed, the given value of the electromagnetic torque is determined.

According to the electromagnetic torque equation and the given value of the electromagnetic torque of the salient pole offset permanent magnet synchronous motor, the current trajectory and the given value of the motor current when the maximum torque per ampere control is operating in the dq coordinate system are calculated.

According to the stator voltage equation of the salient pole offset permanent magnet synchronous motor, the current trajectory when the maximum torque per voltage control is operating in the dq coordinate system is calculated.

Through the rotation transformation of the coordinate system, the current dq coordinate system of the salient pole offset permanent magnet synchronous motor is rotated by a certain angle to obtain a new d'q' coordinate system, and the current trajectory and the given value of the motor current in the d'q' coordinate system are calculated.

According to the current trajectory of the maximum torque per voltage control operation in the d'q' coordinate system, the characteristic current and the quadrature axis current at the characteristic current are obtained.

According to the difference between the limit voltage of the inverter and the given value of the stator voltage, it is judged whether the flux-weakening control needs to be turned on. When it is turned on, the direct axis current compensation is output by the PI controller, the sum of the given value of the direct axis current and the compensation amount of the direct axis current when the maximum torque per ampere control is operating is the given value of the direct axis current in the first flux-weakening region, and the upper limit of the amplitude is not greater than the amplitude of the characteristic current.

According to the difference between the amplitude of the sum of the given value of the direct axis current and the compensation amount of the direct axis current and the amplitude of the characteristic current when the maximum torque per ampere control is operating, the flux-weakening area of the motor is judged, and the output of the compensation amount of the quadrature axis current through the PI controller is determined when the motor works in the second flux-weakening region.

When the first flux-weakening region is operating, the quadrature axis current of the motor is given by the motor current limit circle.

When the second flux-weakening region is operating, the given value of the direct axis current of the motor is the characteristic current, and the given value of the quadrature axis current of the motor is the sum of the quadrature axis current at the characteristic current and the compensation amount of the quadrature axis current.

Through the rotation transformation of the coordinate system, the current d'q' coordinate system of the salient pole offset permanent magnet synchronous motor is rotated to the corresponding angle to obtain the original dq coordinate system, and the given value of the motor current in the dq coordinate system is obtained at the same time.

According to the given value of the motor current and the obtained actual value of the current, the space vector pulse width modulation signal is generated to drive the operation of the salient pole offset permanent magnet synchronous motor, and the flux-weakening speed regulation of the salient pole offset permanent magnet synchronous motor in full speed range is realized.

Figure 2:
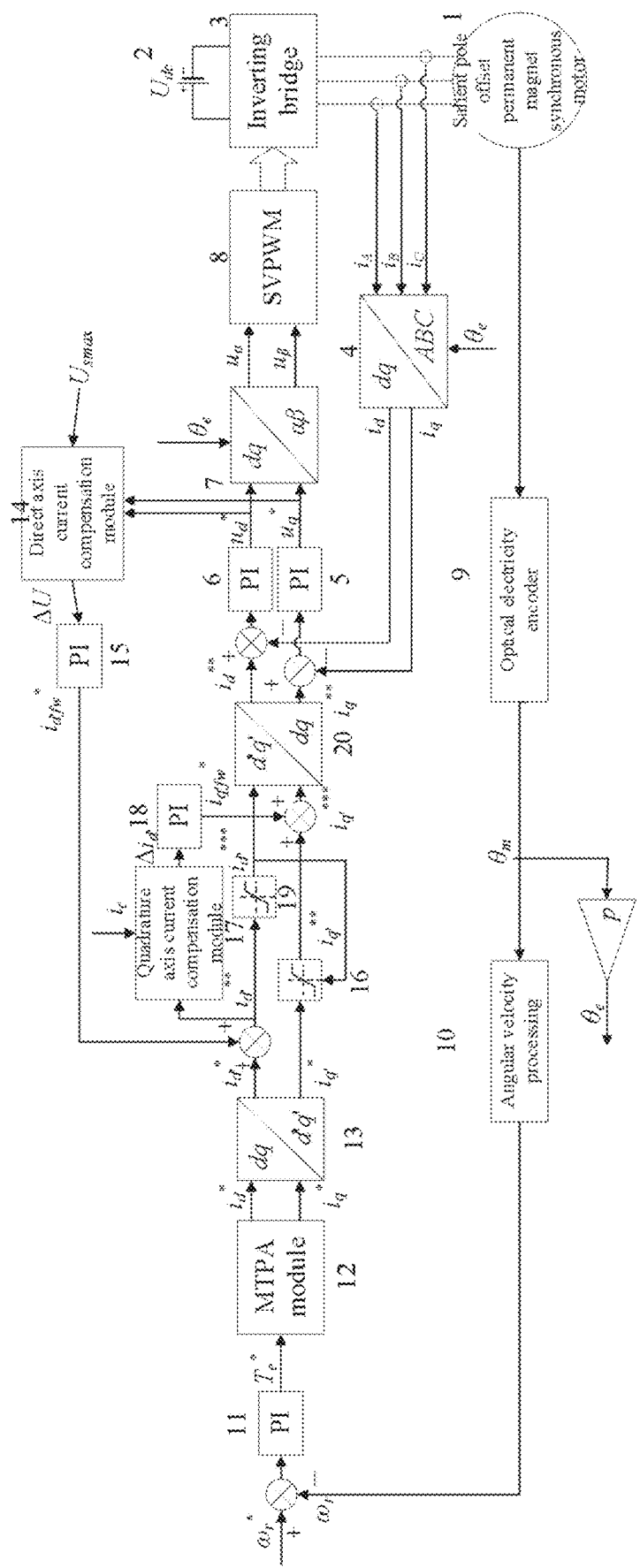
FIG. 2 is a control schematic diagram of the flux-weakening control method for the salient pole offset permanent magnet synchronous motor in Embodiment 1 of the invention.

This embodiment is illustrated by a salient pole offset permanent magnet synchronous motor, as shown in FIG. 2, including a salient pole offset permanent magnet synchronous motor 1, a DC power supply 2, an inverter bridge 3, an ABC-dq converter 4, a quadrature axis current PI controller 5, a direct axis current PI controller 6, a dq-αβ converter 7, an SVPWM module 8, a photoelectric encoder 9, an angular velocity processing module 10, a speed PI controller 11, an MTPA module 12, a dq coordinate system-d'q' coordinate system converter 13, a direct axis current compensation module 14, a direct axis current compensation PI controller 15, a limit current limiting module 16, a quadrature axis current compensation module 17, a quadrature axis current compensation amount PI controller 18, a characteristic current limiting module 19, and a d'q' coordinate system-dq coordinate system converter 20.

In this embodiment, by setting the photoelectric encoder 9 on the rotor shaft of the salient pole offset permanent magnet synchronous motor 1, the rotor mechanical position angle $\theta_m$ of the salient pole offset permanent magnet synchronous motor 1 is measured and sent to the angular velocity processing module 10; the angular velocity processing module 10, according to the rotor position angle $\theta_m$ measured by the photoelectric encoder 9, the speed $\omega_r$ is calculated by differential calculation; according to the speed $\omega_r$ calculated by the angular velocity processing module and the given target speed $\omega_r^*$, the given value of electromagnetic torque $T_e^*$ is calculated by the speed PI controller 11; the MTPA module 12, according to the given value of the electromagnetic torque, relying on the auxiliary function, the given values $i_d^*$ and $i_q^*$ of the d axis current and q axis current of the motor under MTPA condition are obtained; the dq coordinate system-d'q' coordinate system converter 13, the rotation transformation of the coordinate system is used to convert the given values of the d axis current and q axis current of the motor in the dq coordinate system that meet the MTPA conditions into the given values $i_{d'}^*$ and $i_{q'}^*$ of the d axis current and q axis current of the motor in the d'q' coordinate system that meet the MTPA conditions; the direct axis current compensation module 14, according to the difference $\Delta U$ between the limit voltage of the inverter $U_{smax}$ and the given value of the stator voltage $U_s$ to determine whether it is necessary to turn on the flux-weakening control; the direct axis current compensation PI controller 15, according to the $\Delta U$ obtained by the direct axis current compensation module 14, a calculation is performed to obtain the compensation amount of the direct axis current $i_{d'fw}^*$; the limit current limiting module 16, the amplitude of $i_q^*$ is limited in the current limit circle to obtain $i_{q'}^{}$; the quadrature axis current compensation module 17, according to the difference $\Delta i_{d'}$ between the amplitude of the sum $i_{d'}^{}$ of $i_{d'fw}^*$ and $i_{d'}^*$ and the amplitude of the characteristic current $i_c$ to determine whether the quadrature axis current needs to be compensated; the quadrature axis current compensation amount PI controller 18, according to the $\Delta i_{d'}$ obtained by the quadrature axis current compensation module 17, a calculation is performed to obtain the compensation amount of the quadrature axis current $i_{q'fw}^*$; the characteristic current limiting module 19, the amplitude of $i_{d'}^{}$ is limited within the amplitude range of the characteristic current to obtain $i_{d'}^{*}$; the d'q' coordinate system-dq coordinate system converter 20, the rotation transformation of the coordinate system is used to convert the sum $i_{q'}^{*}$ of $i_{q'}^{}$ and $i_{q'fw}^*$ and $i_{d'}^{*}$ into the given values of quadrature axis current and direct axis current $i_q^{}$ and $i_d^{}$ in dq coordinate system; the ABC-dq converter 4, it is used to transform the three-phase current value of the motor input obtained by the current transformer into the dq coordinate system by using the electric angle $\theta_c$, and the actual current values $i_d$ and $i_q$ of the d axis and q axis are obtained; the direct axis current PI controller 6, according to the given value $i_d^{}$ of the direct axis current of the motor and the actual value $i_d$ of the direct axis current, the given value of the d axis voltage $u_d^*$ is calculated; the quadrature axis current PI controller 5, according to the given value $i_q^{**}$ of the quadrature axis current of the motor and the actual value $i_q$ of the quadrature axis current, the given value of the q axis voltage $u_q^*$ is calculated; the dq-αβ converter 7, the voltage given values $u_d^*$ and $u_q^*$ are transformed from d-q coordinate system to α-β coordinate system by using the electric angle $\theta_c$, and $u_\alpha$ and $u_\beta$ are obtained. The SVPWM module 8, based on the voltage given $u_\alpha$ and $u_\beta$, the three-phase PWM signal is obtained and sent to the inverter bridge module; the inverter bridge module 3, it is connected to the DC power supply 2 and the salient pole offset permanent magnet synchronous motor 1, and the three-phase voltage value is generated according to the aforementioned three-phase PWM signal to drive the motor.

Figure 3A:
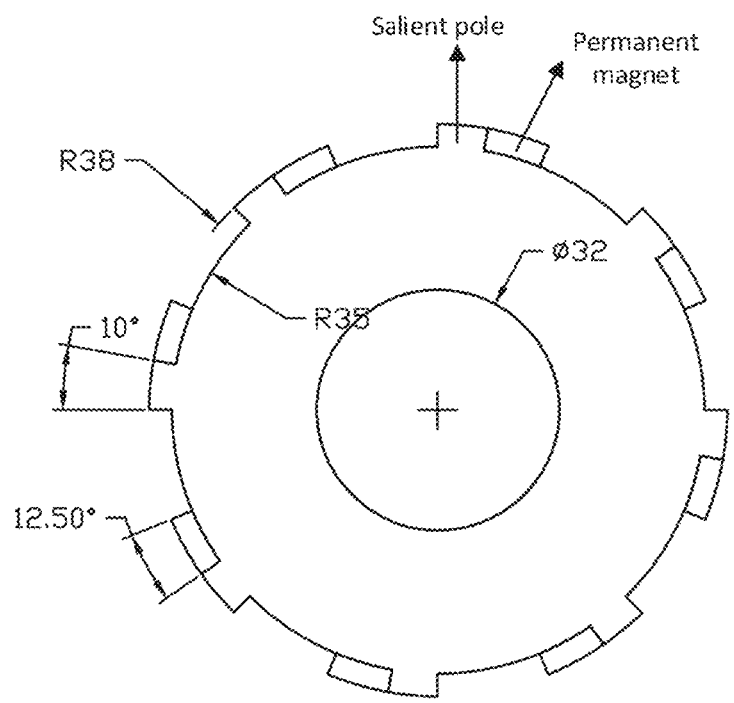
FIG. 3A is a topological structural diagram of the rotor of the salient pole offset permanent magnet synchronous motor in Embodiment 1 of the invention.
Figure 3B:
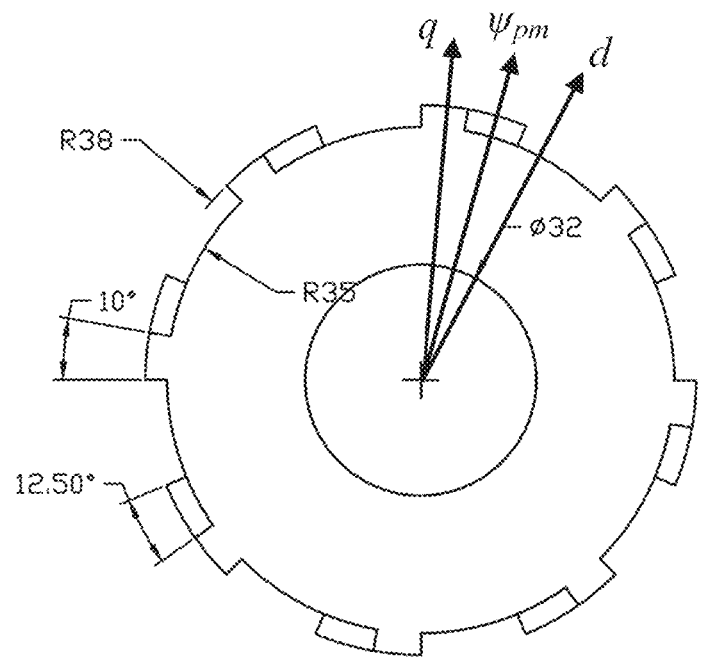
FIG. 3B is a relative position diagram of the quadrature axis (q axis), the direct axis (d axis), and the permanent magnet flux linkage of the salient pole offset permanent magnet synchronous motor in Embodiment 1 of the invention.

The rotor topology of the salient pole offset permanent magnet synchronous motor is shown in FIG. 3A, the salient pole of the motor is connected with the permanent magnet, and the dq axis orientation position on each pole is shown in FIG. 3B. The direction and position of the rotor permanent magnet flux linkage are located at the angle bisector of the dq axis (that is, the direct axis position will be about 45° from the permanent magnet flux linkage position).

Figure 4A:
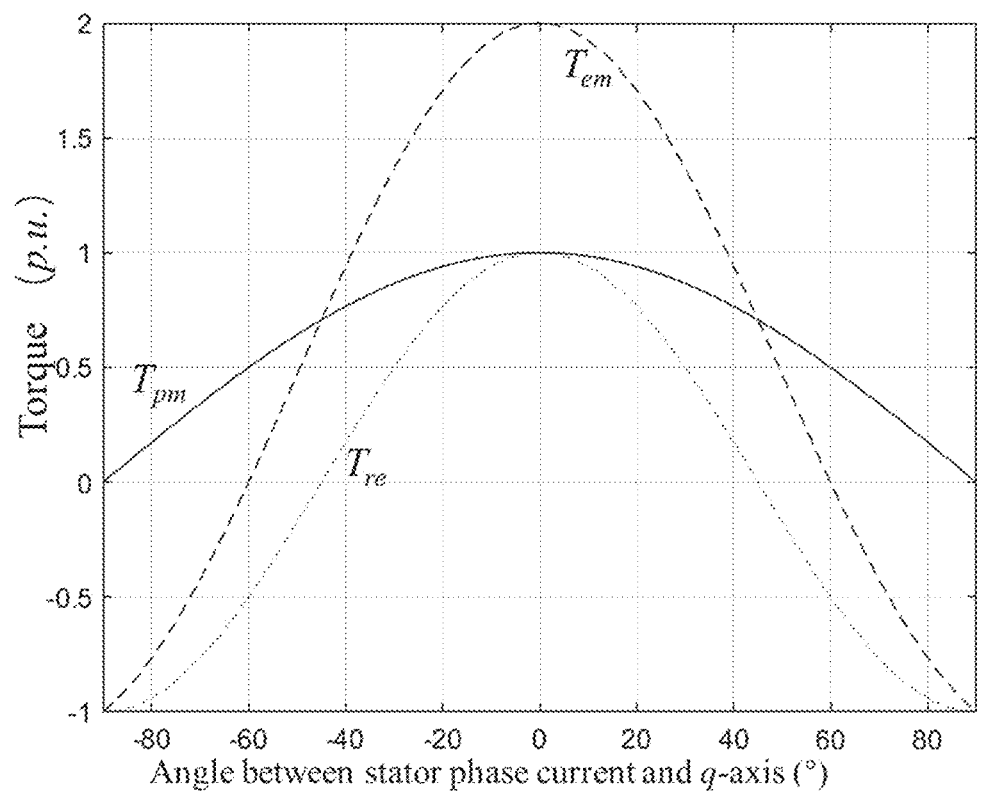
FIG. 4A is a schematic diagram of the relationship between the permanent magnet torque and the reluctance torque in the motor with the current phase angle in Embodiment 1 of the invention.
Figure 4B:
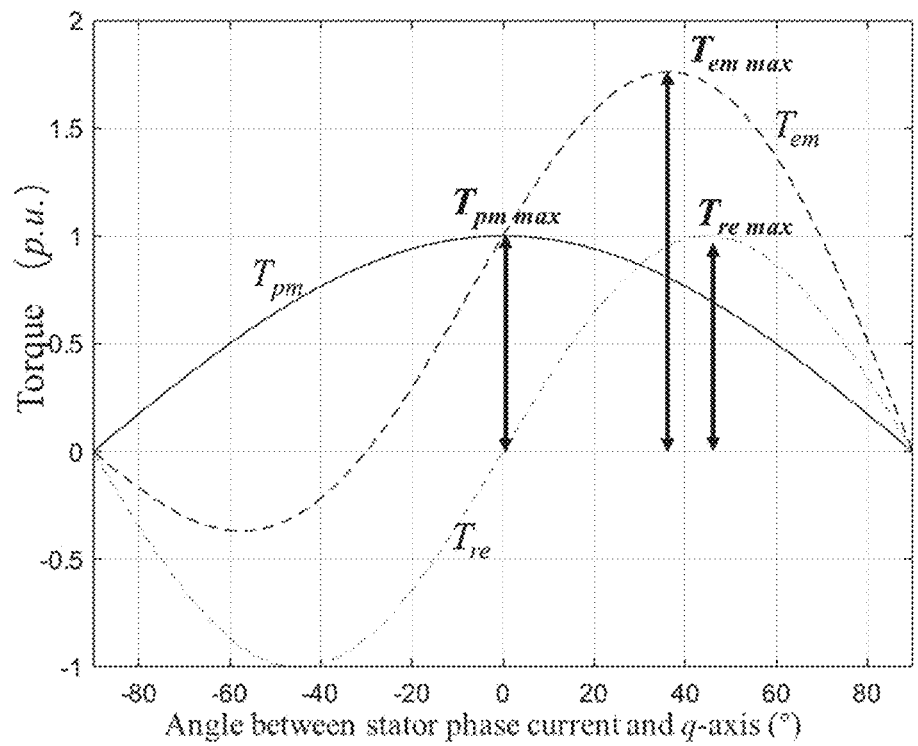
FIG. 4B shows the relationship between the torque amount and the current phase angle in the traditional permanent magnet synchronous motor.

The unique topology of the salient pole offset permanent magnet synchronous motor makes the maximum permanent magnet torque $T_{pm}$ and the maximum reluctance torque $T_{re}$ superimposed at the same current phase angle to obtain the total torque $T_{em}$, as shown in FIG. 4A. Compared with the traditional salient pole permanent magnet motor (as shown in FIG. 4B), the maximum total torque is improved, so that the motor has a larger torque density.

Figure 5:
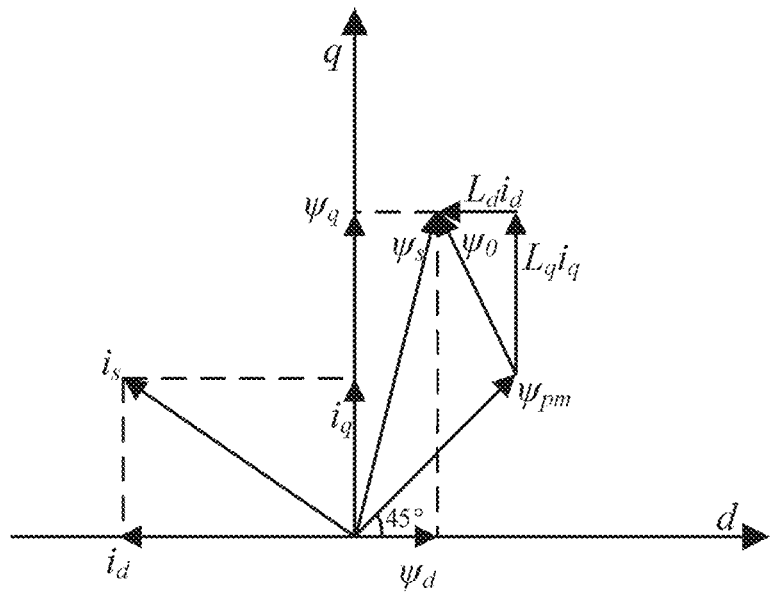
FIG. 5 is a space-time unified vector diagram of each electrical quantity of the motor in Embodiment 1 of the invention.
Figure 6:
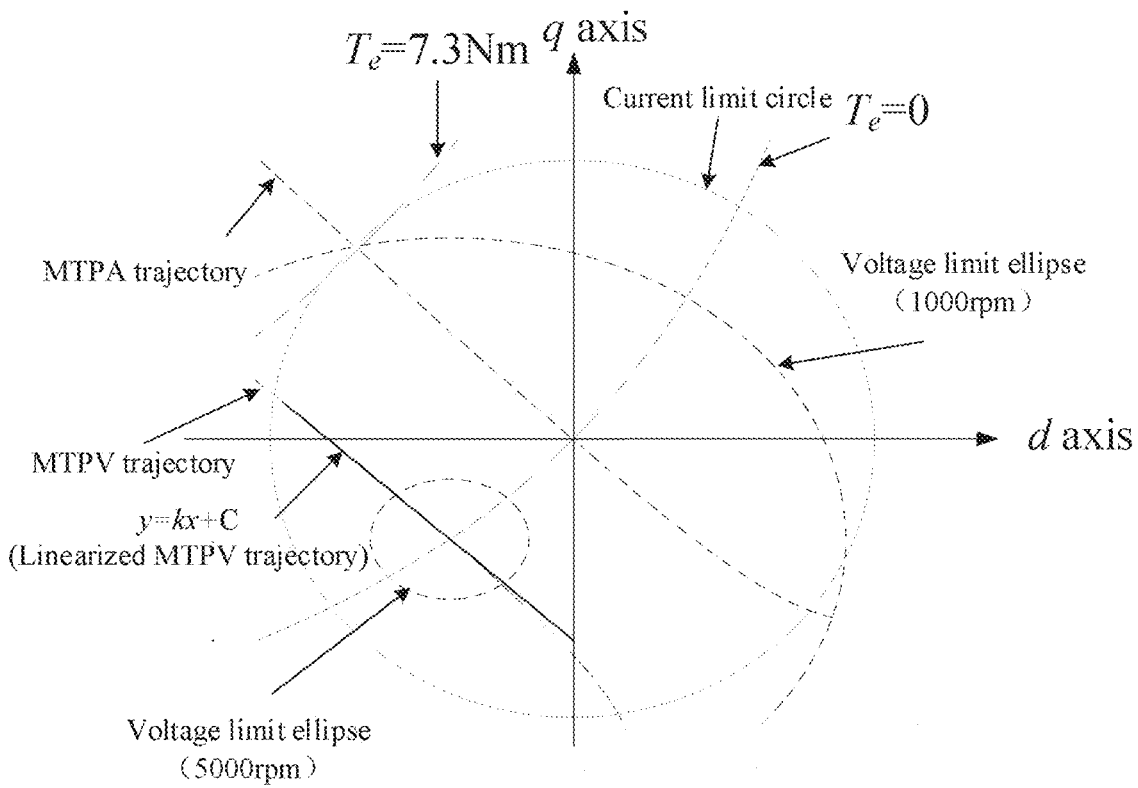
FIG. 6 is a schematic diagram of the MTPA trajectory, MTPV trajectory, current limit circle, voltage limit ellipse, and other current trajectories in the dq coordinate system of Embodiment 1 of the invention.

According to the distribution of magnetic field lines, the motor space vector diagram shown in FIG. 5 is obtained, where $i_s$ is a stator current space vector, $i_d$ and $i_q$ are the quadrature and direct axis amounts of $i_s$ respectively, and $i_d^2 + i_q^2 \leq i_{smax}^2$, $i_{smax}$ is the motor limit current (the motor current limit circle is shown in FIG. 6), $\psi_{pm}$ is the permanent magnet flux linkage generated by the permanent magnet, the permanent magnet flux linkage offset angle is 45°, $\psi_0$ is the flux linkage generated by $i_s$, and $\psi_s$ is the combined flux linkage of $\psi_0$ and $\psi_{pm}$.

The electromagnetic torque equation of the salient pole offset permanent magnet synchronous motor is:

$$T_e = \frac{3}{2} p \left( \psi_{pm} \left( \frac{\sqrt{2}}{2} i_q - \frac{\sqrt{2}}{2} i_d \right) + i_d i_q (L_d - L_q) \right) \quad (1)$$

where p is a pole pair of the motor, $L_d$ is the inductance of the d axis, $L_q$ is the inductance of the q axis, and $T_e$ is the electromagnetic torque.

Ignoring the stator resistance, since the permanent magnet flux linkage $\psi_{pm}$ of the salient pole offset permanent magnet synchronous motor is 45° ahead of the d axis, the d axis voltage $u_d$ and the q axis voltage $u_q$ of the motor under a stable state can be expressed as:

$$\begin{cases} u_d \approx -\omega_r L_q i_q - \dfrac{\sqrt{2}}{2}\omega_r \psi_{pm} \\ u_q \approx \omega_r L_d i_d + \dfrac{\sqrt{2}}{2}\omega_r \psi_{pm} \end{cases} \quad (2)$$

therefore, $$U = \sqrt{\omega_r^2 \left(L_q i_q + \dfrac{\sqrt{2}}{2}\psi_{pm}\right)^2 + \omega_r^2 \left(L_d i_d + \dfrac{\sqrt{2}}{2}\psi_{pm}\right)^2} \quad (3)$$

U is the stator voltage of the salient pole offset permanent magnet synchronous motor.

A flux-weakening control method for the salient pole offset permanent magnet synchronous motor provided in this embodiment includes:

According to the measured rotor position angle of the salient pole offset permanent magnet synchronous motor and the given target speed, the given value of electromagnetic torque is determined;

according to the electromagnetic torque equation of the salient pole offset permanent magnet synchronous motor, the auxiliary function is constructed, under the condition of MTPA, the Lagrange multiplier is used to introduce the auxiliary function to obtain the objective function, and the extreme point of the objective function is solved; by giving the given value of the electromagnetic torque, the MTPA control current trajectory in the dq coordinate system (as shown in FIG. 6) and the given values of the quadrature axis current and direct axis current that meet the MTPA conditions are obtained;

in the MTPA module of this embodiment, in order to obtain the relationship between current and torque, that is, to obtain the minimum value of $i_q^2 + i_d^2$ under a certain $T_e$, and to obtain the relationship between $i_q$ and $i_d$ under this condition, the Lagrange extremum theorem is used, the Lagrange multiplier $\lambda$ is used and introduced into the auxiliary function, and the following results are obtained:

$$F = i_d^2 + i_q^2 + \lambda\left(\dfrac{3}{2}p\left(\psi_{pm}\left(\dfrac{\sqrt{2}}{2}i_q - \dfrac{\sqrt{2}}{2}i_d\right) + i_d i_q (L_d - L_q)\right) - T_e\right) \quad (4)$$

according to the Lagrange extreme value theorem, the required relationship between $i_q$ and $i_d$ is the extreme point of the above function F, that is:

$$\begin{cases} \dfrac{\partial F}{\partial i_d} = 0 \\ \dfrac{\partial F}{\partial i_q} = 0 \\ T_e = \dfrac{3}{2}p\left(\psi_{pm}\left(\dfrac{\sqrt{2}}{2}i_q - \dfrac{\sqrt{2}}{2}i_d\right) + i_d i_q (L_d - L_q)\right) \end{cases} \quad (5)$$

the extraneous root is rounded down to obtain:

$$i_d = \dfrac{\sqrt{2}\psi_{pm}}{4(L_q - L_d)} - \sqrt{\dfrac{\psi_{pm}^2}{8(L_q - L_d)^2} + \dfrac{\sqrt{2}\psi_{pm}}{2(L_q - L_d)}i_q + i_q^2} \quad (6)$$

due to the limitation of the limit voltage of the inverter $U_{smax}$, according to the stator voltage equation (3) of the salient pole offset permanent magnet synchronous motor, the voltage limit equation of the motor can be obtained:

$$\left(\omega_r L_q i_q + \dfrac{\sqrt{2}}{2}\omega_r \psi_{pm}\right)^2 + \left(\omega_r L_d i_d + \dfrac{\sqrt{2}}{2}\omega_r \psi_{pm}\right)^2 \leq U_{smax}^2 \quad (7)$$

that is:

$$\left(\dfrac{i_d + \dfrac{\sqrt{2}}{2}\dfrac{\psi_{pm}}{L_d}}{\dfrac{1}{L_d}\dfrac{U_{smax}}{\omega_r}}\right)^2 + \left(\dfrac{i_q + \dfrac{\sqrt{2}}{2}\dfrac{\psi_{pm}}{L_q}}{\dfrac{1}{L_q}\dfrac{U_{smax}}{\omega_r}}\right)^2 \leq 1 \quad (8)$$

where $U_{smax}$ is the limit voltage of the inverter.

The voltage limit equation is an ellipse whose center is $$\left(-\dfrac{\sqrt{2}}{2}\dfrac{\psi_{pm}}{L_d}, -\dfrac{\sqrt{2}}{2}\dfrac{\psi_{pm}}{L_q}\right),$$

the vertex of its long axis is $$\left(\pm\dfrac{1}{L_d}\dfrac{U_{smax}}{\omega_r}, -\dfrac{\sqrt{2}}{2}\dfrac{\psi_{pm}}{L_q}\right),$$

and the vertex of its short axis is $$\left(-\dfrac{\sqrt{2}}{2}\dfrac{\psi_{pm}}{L_d}, \pm\dfrac{1}{L_q}\dfrac{U_{smax}}{\omega_r}\right).$$

The connection between the voltage limit ellipse and the motor torque hyperbolic tangent point is the MTPV trajectory, the MTPV equation of the motor can be expressed by the following formula:

$$\dfrac{\partial T_e}{\partial i_d}\dfrac{\partial U}{\partial i_q} - \dfrac{\partial T_e}{\partial i_q}\dfrac{\partial U}{\partial i_d} = 0 \quad (9)$$

according to (1), (3), (9), the following is obtained:

$$\left[-\dfrac{\sqrt{2}}{2}\psi_{pm} + i_q(L_d - L_q)\right]\left(L_q^2 i_q + \dfrac{\sqrt{2}}{2}L_q \psi_{pm}\right) - \quad (10)$$

$$\left[\dfrac{\sqrt{2}}{2}\psi_{pm} + i_d(L_d - L_q)\right]\left(L_d^2 i_d + \dfrac{\sqrt{2}}{2}L_d \psi_{pm}\right) = 0$$

that is:

$$-\frac{\sqrt{2}}{2}\psi_{pm}L_q^2 i_q - \frac{1}{2}\psi_{pm}^2 L_q + (L_d - L_q)L_q^2 i_q^2 - \frac{\sqrt{2}}{2}\psi_{pm}L_d^2 i_d - \frac{1}{2}\psi_{pm}^2 L_d - \quad (11)$$

$$(L_d - L_q)L_d^2 i_d^2 + \frac{\sqrt{2}}{2}(L_d - L_q)\psi_{pm}L_q i_q - \frac{\sqrt{2}}{2}(L_d - L_q)\psi_{pm}L_d i_d = 0$$

Figure 7:
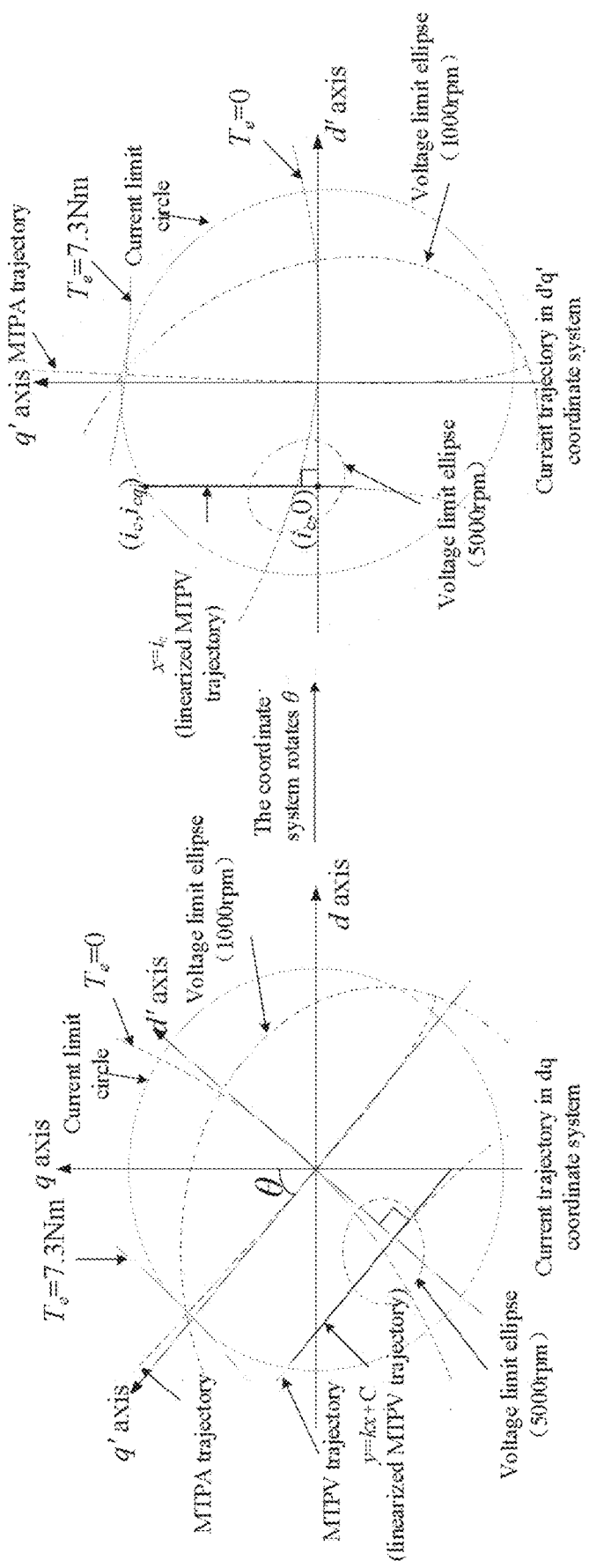
FIG. 7 is a schematic diagram of the rotation transformation of the coordinate system in Embodiment 1 of the invention.

The obtained MTPV trajectory is shown in FIG. 6, this trajectory can be approximated as a straight line y=kx+C (C is a constant) with a slope of k, and θ=−90°+arctan (k);

through the rotation transformation of the coordinate system (as shown in FIG. 7), the current dq coordinate system of the salient pole offset permanent magnet synchronous motor is rotated by a certain angle θ to obtain a new d'q' coordinate system, so that the MTPV control current trajectory in the d'q' coordinate system of the salient pole offset permanent magnet synchronous motor is perpendicular to the abscissa axis (that is, the d' coordinate axis);

then the given value of the current ($i_d^*$, $i_q^*$) in the dq coordinate system during MTPA operation can be expressed as ($i_{d'}^*$, $i_{q'}^*$) in the d'q' coordinate system after the rotation transformation of the coordinate system, including:

$$\begin{cases} i_{d'}^* = i_d^* \cos\theta + i_q^* \sin\theta \\ i_{q'}^* = -i_d^* \sin\theta + i_q^* \cos\theta \end{cases} \quad (12)$$

The direct axis current at the intersection of the MTPV control current trajectory in the d'q' coordinate system after the rotation transformation of the coordinate system and the abscissa axis (that is, the d' coordinate axis) is the characteristic current $i_c$, and the cross-axis current at the intersection of the MTPV control current trajectory in the d'q' coordinate system after the rotation transformation of the coordinate system and the current limit circle in the d'q' coordinate system is $i_{cq}$;

as shown in FIG. 7, the current limit circle and the voltage limit ellipse in the dq coordinate system of the motor can be obtained by the rotation transformation of the coordinate system to obtain the current limit circle and the voltage limit ellipse in the d'q' coordinate system;

as shown in FIG. 7, the MTPA control current trajectory in the dq coordinate system of the motor and the given values of the quadrature axis current and direct axis current that meet the MTPA conditions, and the MTPV control current trajectory and the given values of the quadrature and direct axis currents that meet the MTPV conditions can be obtained by the rotation transformation of the coordinate system. The MTPA control current trajectory in the d'q' coordinate system and the given values of the quadrature axis current and direct axis current that meet the MTPA conditions, and the MTPV control current trajectory and the given values of the quadrature axis current and direct axis current that meet the MTPV conditions;

according to the difference ΔU between the limit voltage $U_{smax}$ of the inverter and the given value $U_s$ of the stator voltage, it is judged whether the flux-weakening control needs to be turned on, including:

$$\begin{cases} U_{s\,max} = \dfrac{U_{dc}}{\sqrt{3}} \\ U_s = \sqrt{u_d^{*2} + u_q^{*2}} \end{cases} \quad (13)$$

where $U_{dc}$ is the DC bus voltage, $u_d^*$ is the given value of d axis voltage, and $u_q^*$ is the given value of q axis voltage.

Then ΔU is:

$$\Delta U = U_{s\,max} - U_s \quad (14)$$

When ΔU<0, the flux-weakening control is turned on, and the direct axis current compensation $i_{d'fw}^*$ is output through the PI controller with ΔU as the input;

the amplitude of the sum $i_{d'}^{**}$ of the given value of the direct axis current $i_{d'}^*$ and the compensation amount of the direct axis current $i_{d'fw}^{}$ and the compensation amount of the direct axis current that conform to the MTPA condition in the d'q' coordinate system are limited to the amplitude of the characteristic current $i_c$, so as to obtain the given value of the direct axis current $i_{d'}^{*}$ in the d'q' coordinate system.

$$i_{d'}^{*} = \begin{cases} i_{d'}^{} = i_{d'}^* + i_{d'fw}^*, & |i_{d'}^{}| \le |i_c| \\ i_c, & |i_{d'}^{}| > |i_c| \end{cases} \quad (15)$$

The flux-weakening control of this embodiment is divided into the first flux-weakening region and the second flux-weakening region, when the amplitude of the sum $i_{d'}^{**}$ of the compensation amount of the direct axis current $i_{d'fw}^*$ and the given value of the direct axis current $i_{d'}^*$ in the d'q' coordinate system that meets the MTPA condition is less than or equal to the amplitude of the characteristic current $i_c$, it is the first flux-weakening region, at this time, the given value of the quadrature axis current in the d'q' coordinate system of the flux-weakening control (the first flux-weakening region) is given by the current limit circle in the d'q' coordinate system of the motor, that is, $i_{q'}^*$ is limited to the current limit circle, and $i_{q'}^*$ is obtained.

$$i_{q'}^{**} = \begin{cases} i_{q'}^*, & i_{q'}^{*2} + i_{d'}^{*2} \le i_{s\,max}^2 \\ \sqrt{i_{s\,max}^2 - i_{d'}^{*2}}, & i_{q'}^{*2} + i_{d'}^{***2} > i_{s\,max}^2 \end{cases} \quad (16)$$

When the amplitude of $i_{d'}^{}$ is greater than the amplitude of the characteristic current $i_c$, it is the second flux-weakening region, at this time, the amplitude of $i_{d'}^{}$ exceeds the amplitude of the characteristic current $i_c$, and the part $\Delta i_{d'}$ of the amplitude of $i_{d'}^*$ exceeds the amplitude of the characteristic current $i_c$, the compensation amount of the quadrature axis current $i_{q'fw}^*$ obtained by the PI controller, the sum of the quadrature axis current $i_{cq}$ at the intersection of the compensation amount of the quadrature axis current $i_{q'fw}^*$ and the MTPV control current trajectory in the d'q' coordinate system and the current limit circle in the d'q' coordinate system are the given values of the quadrature axis current in the d'q' coordinate system under flux-weakening control (the second flux-weakening region).

$$i_{q'}^{*} = \begin{cases} i_{q'}^{}, & \text{the first flux-weaking region} \\ i_{q'fw}^* + i_{cq}, & \text{the second flux-weaking region} \end{cases} \quad (17)$$

In the full speed range, the d'q' coordinate system of the motor's d axis and quadrature axis given values of the current $i_{q'}$** and $i_{d'}$* can be expressed as:

$$\begin{cases} i_{d'}^{***} = \begin{cases} i_{d'}^*, & \text{MTPA region} \\ i_{d'}^* + i_{d'fw}^*, & \text{first flux-weakening region} \\ i_c, & \text{second flux-weakening region} \end{cases} \\ i_{q'}^{***} = \begin{cases} i_{q'}^*, & \text{MTPA region} \\ \sqrt{i_{s\ max}^2 - i_{d'}^{***2}}, & \text{first flux-weakening region} \\ i_{q'fw} + i_{cq}, & \text{second flux-weakening region} \end{cases} \end{cases} \quad (18)$$

where $i_q$* is the given value of the quadrature axis current in the d'q' coordinate system, which satisfies the MTPA condition.

Then $i_{q'}$* and $i_{d'}$* can be transformed into the given values of quadrature axis current and direct axis current $i_q$ and $i_d$ in dq coordinate system by rotation transformation of the coordinate system, namely:

$$\begin{cases} i_d^{} = i_{d'}^{*}\cos(-\theta) + i_{q'}^{*}\sin(-\theta) \\ i_q^{} = -i_{d'}^{*}\sin(-\theta) + i_{q'}^{*}\cos(-\theta) \end{cases} \quad (19)$$

Figure 8:
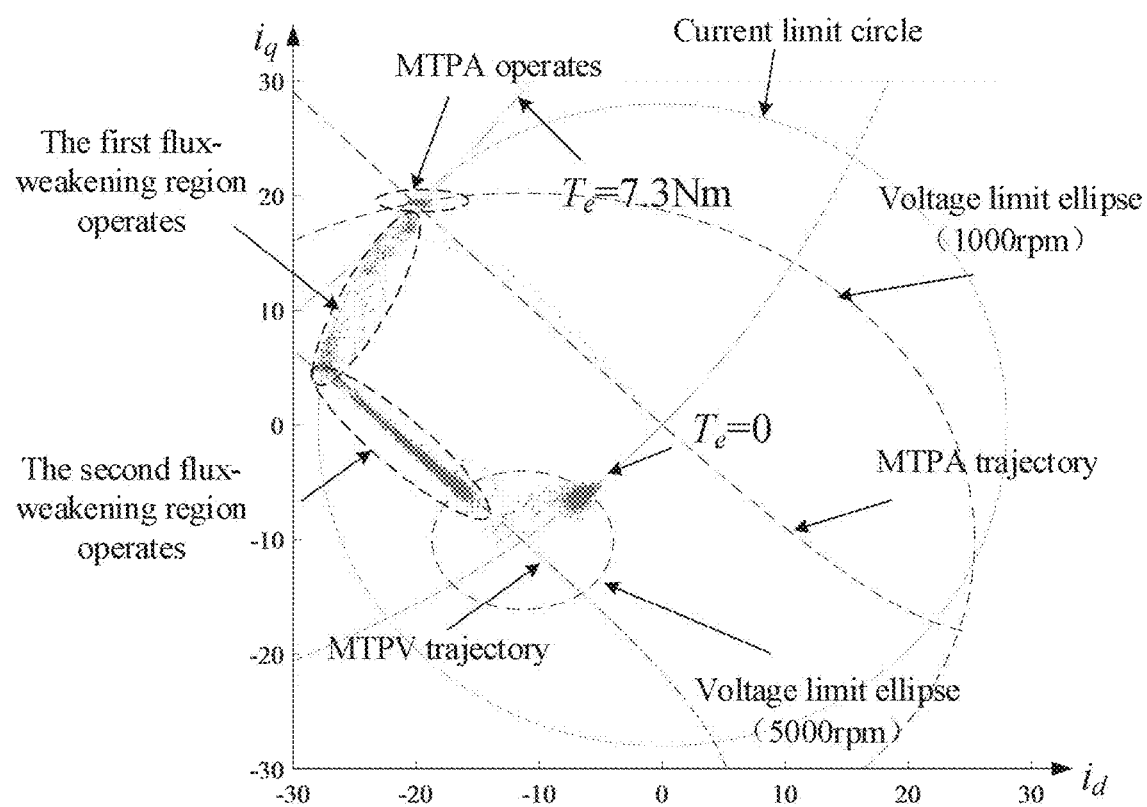
FIG. 8 is a simulation scatter diagram of the dq axis current of the motor in Embodiment 1 of the invention.
Figure 9:
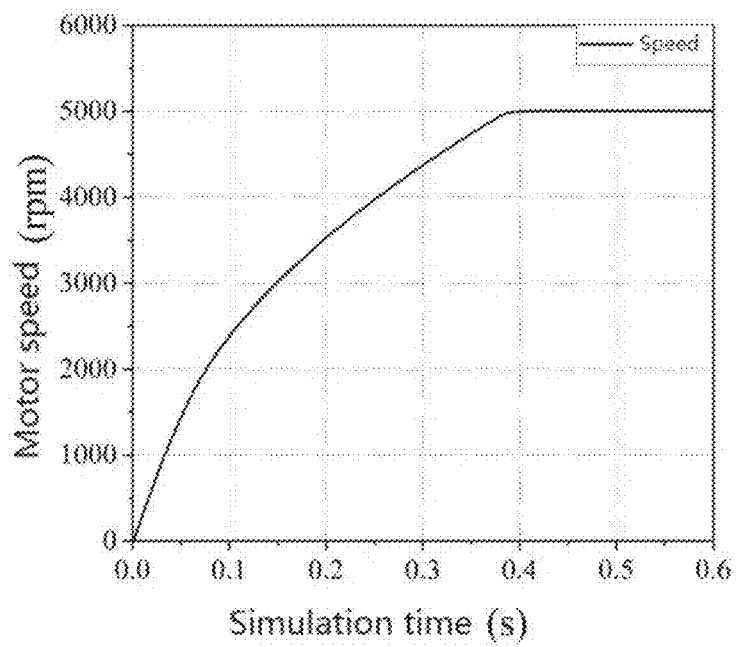
FIG. 9 is a speed simulation waveform diagram of the given motor with a speed of 5000 rpm in the embodiment of the invention.
Figure 10:
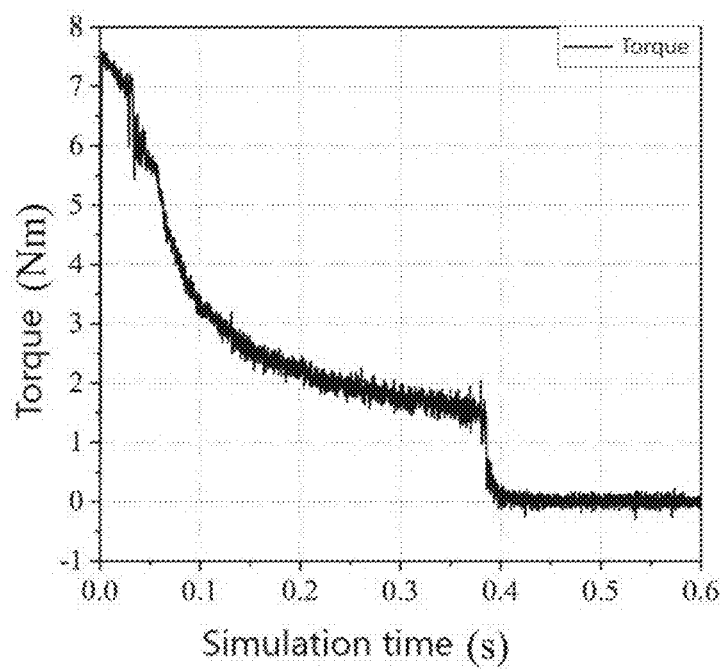
FIG. 10 is a torque simulation waveform diagram of the given motor with a speed of 5000 rpm in the embodiment of the invention.
Figure 11:
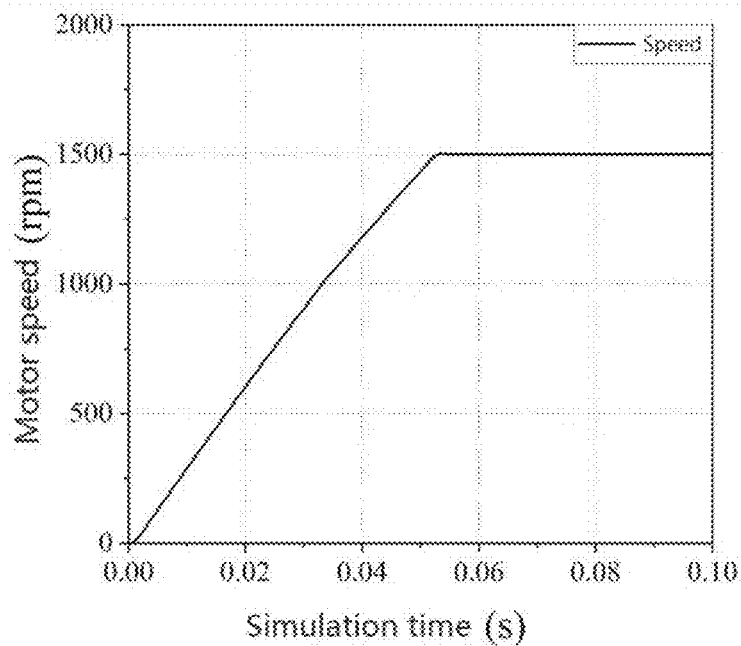
FIG. 11 is a speed simulation waveform diagram when the motor speed reaches the limit when the traditional method is used for flux-weakening control.
Figure 12:
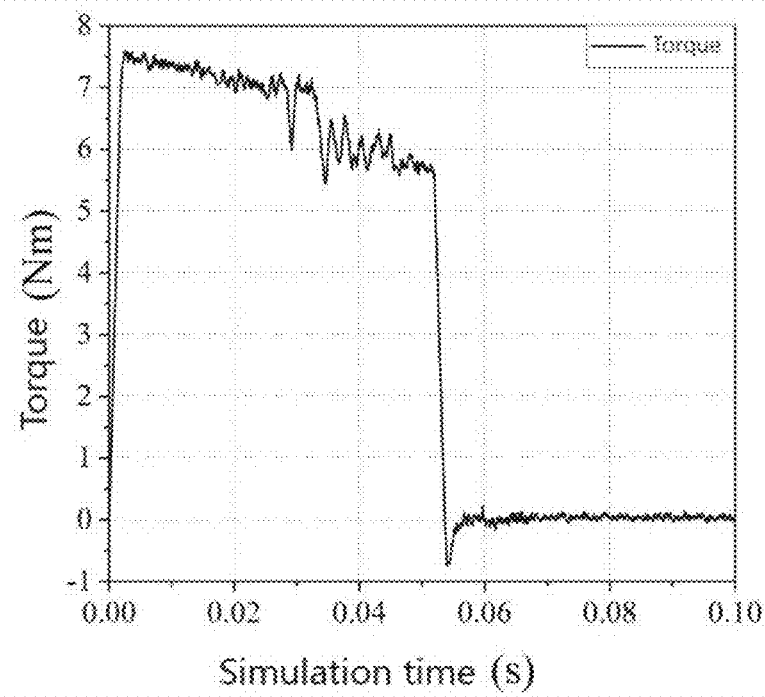
FIG. 12 is a torque simulation waveform diagram when the motor speed reaches the limit when the traditional method is used for flux-weakening control.

The d axis and q axis current simulation scatters of the motor in this embodiment are shown in FIG. 8, and FIG. 9 and FIG. 10 show the speed and torque simulation waveforms of the given motor with a speed of 5000 rpm in this embodiment. FIG. 11 and FIG. 12 show the speed and torque simulation waveforms when the motor speed reaches the limit when the traditional method is used for flux-weakening control, In this embodiment, $U_{dc}$ is 60V.

As shown in FIG. 11 and FIG. 12, the limit of the motor speed is about 1500 rpm when the traditional method (only the d axis flux-weakening current is introduced) is used for flux-weakening control. When the given speed exceeds the limit, the motor is out of control; as shown in FIG. 9 and FIG. 10, the flux-weakening control method provided in this embodiment can make the motor reach a given speed of 5000 rpm smoothly. At the same time, as shown in FIG. 8, the motor realizes the operation of MTPA, the first flux-weakening region, and the second flux-weakening region (MTPV operation), so as to maximize the torque output of the motor when the flux-weakening control system is operating. It should be noted that the given speed of the motor in this embodiment is 5000 rpm does not mean that the maximum speed range of the motor in the flux-weakening control method provided in this embodiment is 5000 rpm, in order to illustrate the specific working mode of the flux-weakening control in this embodiment, in fact, if the influence of factors such as wind friction loss of the motor is ignored, the speed range of the motor in this embodiment can reach infinity in theory, and the full speed range of the flux-weakening speed regulation of the salient pole offset permanent magnet synchronous motor can be realized.

The control method introduced in this embodiment is not only applicable to three-phase motors, but also can be extended to the flux-weakening control of the salient pole offset permanent magnet synchronous motors with any number of phases.

Embodiment 2

The second embodiment of the invention introduces a flux-weakening control system of the salient pole offset permanent magnet synchronous motor.

Figure 13:
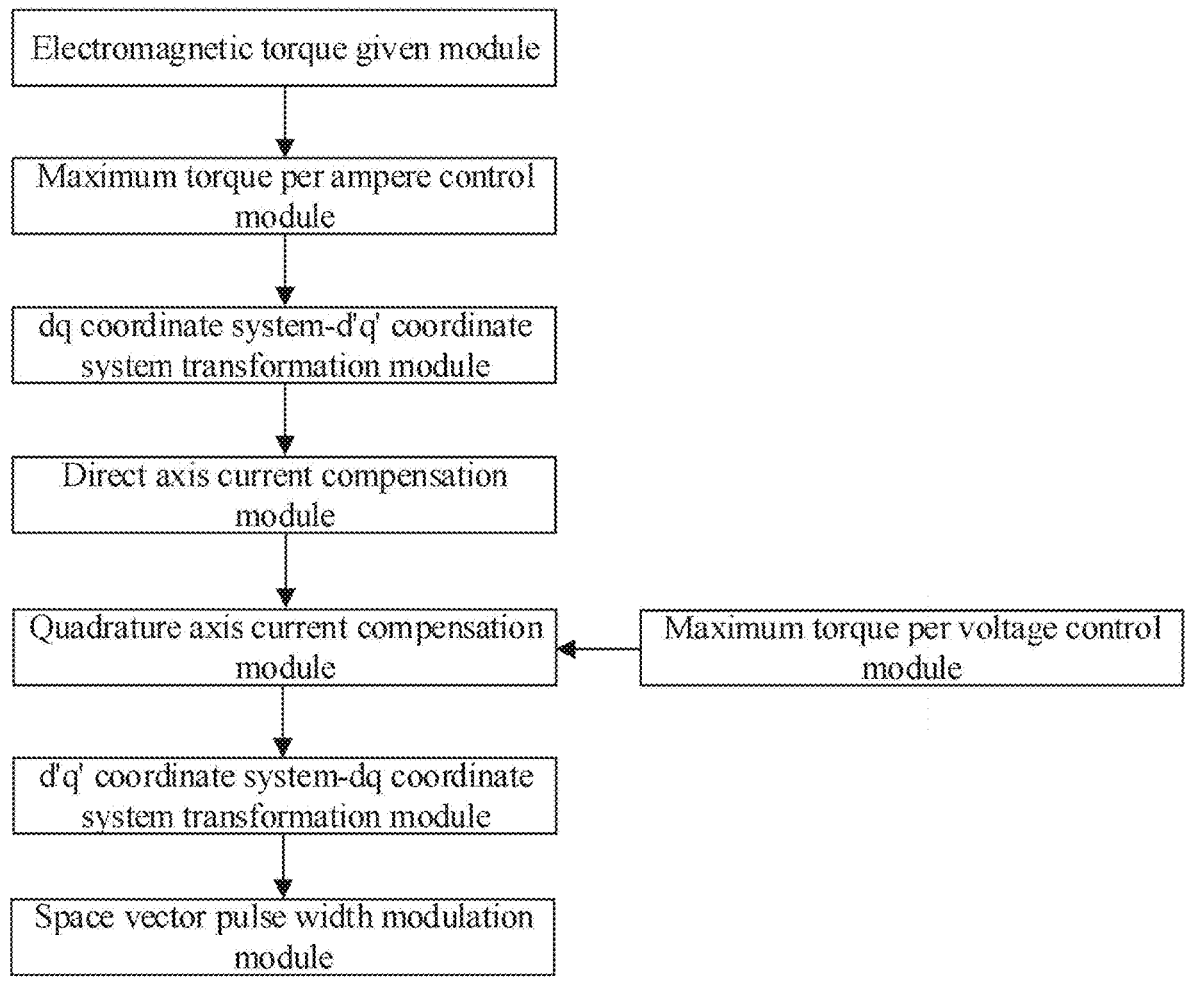
FIG. 13 is a structural diagram of the flux-weakening control system of the salient pole offset permanent magnet synchronous motor in Embodiment 2 of the invention.

The flux-weakening control system of the salient pole offset permanent magnet synchronous motor, shown in FIG. 13, includes:

An electromagnetic torque given module, the electromagnetic torque given module is configured to obtain the real-time speed of the salient pole offset permanent magnet synchronous motor, combined with the given speed of the motor, the given value of the electromagnetic torque of the motor is obtained;

a maximum torque per ampere control module, the maximum torque per ampere control module is configured to calculate the given values of the quadrature axis current and direct axis current of the motor when the maximum torque per ampere control is operating according to the electromagnetic torque equation and the given value of the electromagnetic torque;

a dq coordinate system-d'q' coordinate system transformation module, the dq coordinate system-d'q' coordinate system transformation module is configured to transform the given value of the current in the dq coordinate system into the given value of the current in the d'q' coordinate system;

a maximum torque per voltage control module, the maximum torque per voltage control module is configured to calculate the current trajectory of the motor when the maximum torque per voltage control is operating according to the stator voltage equation, according to the calculation result of the dq coordinate system-d'q' coordinate system transformation module and the current trajectory when the maximum torque per voltage control is operating, the characteristic current and the quadrature axis current at the characteristic current are obtained;

a direct axis current compensation module, the direct axis current compensation module is configured to determine whether the flux-weakening control needs to be turned on according to the difference between the limit voltage of the inverter and the given value of the stator voltage, and output the compensation amount of the direct axis current when it is turned on, according to the calculation result of the dq coordinate system-d'q' coordinate system transformation module and the compensation amount of the direct axis current, the given value of the current of the salient pole offset permanent magnet synchronous motor operating in the first flux-weakening region is calculated;

a quadrature axis current compensation module, the quadrature axis current compensation module is configured to determine whether it is necessary to turn on the second flux-weakening region according to the difference between the amplitude of the sum of the given value of the direct axis current and the compensation amount of the direct axis current and the amplitude of the characteristic current when the maximum torque per ampere control is operating, and output the compensation amount of the quadrature axis current when turning on, according to the calculation result of the direct axis current compensation module, the quadrature axis current at the characteristic current and the compensation amount of the quadrature axis current, the given value of the current of the salient pole offset permanent magnet synchronous motor operating in the second flux-weakening region is calculated;

a d'q' coordinate system-dq coordinate system transformation module, the d'q' coordinate system-dq coordinate system transformation module is configured to transform the given value of the current in the d'q' coordinate system into the given value of the current in the dq coordinate system;

a space vector pulse width modulation module, the space vector pulse width modulation module is configured to generate a space vector pulse width modulation signal according to the given value of the motor current and an obtained actual value of the current, the space vector pulse width modulation module is used to drive the operation of the salient pole offset permanent magnet synchronous motor, complete the flux-weakening control of the salient pole offset permanent magnet synchronous motor, and realize the flux-weakening speed regulation of the salient pole offset permanent magnet synchronous motor in the full speed range.

The detailed steps are the same as the flux-weakening control method for the salient pole offset permanent magnet synchronous motor provided in Embodiment 1, which will not be repeated here.

The above content shows only the preferred embodiments of the embodiments, and is not used to limit this embodiment, for technicians in this field, this embodiment can have various amendments and changes. Any modification, equivalent replacement, improvement, etc., within the spirit and principles of this embodiment, shall be included in the scope of protection of the embodiments.

What is claimed is:

1. A flux-weakening control method for a salient pole offset permanent magnet synchronous motor, comprising:

according to an actual speed of the salient pole offset permanent magnet synchronous motor and a given target speed, determining a given value of an electromagnetic torque;

according to an electromagnetic torque equation and the given value of the electromagnetic torque of the salient pole offset permanent magnet synchronous motor, calculating a current trajectory and a given value of a motor current when a maximum torque per ampere control is operating in a dq coordinate system;

according to a stator voltage equation of the salient pole offset permanent magnet synchronous motor, calculating the current trajectory when a maximum torque per voltage control is operating in the dq coordinate system;

through a rotation transformation of the coordinate system, rotating the dq coordinate system of the salient pole offset permanent magnet synchronous motor by a predetermined angle to obtain a new d'q' coordinate system, and calculating the current trajectory and the given value of the motor current in the d'q' coordinate system;

according to the current trajectory when the maximum torque per voltage control is operating in the d'q' coordinate system, obtaining a characteristic current and a quadrature axis current at the characteristic current;

according to a difference between a limit voltage of an inverter and a given value of a stator voltage, judging whether a flux-weakening control needs to be turned on, when the flux-weakening control is turned on, outputting a direct axis current compensation by the proportional integral (PI) controller, a sum of a given value of a direct axis current and a compensation amount of the direct axis current when a maximum torque per ampere control is operating in the d'q' coordinate system is a given value of the direct axis current in a first flux-weakening region, and an upper limit of an amplitude is less than or equal to a amplitude of the characteristic current;

according to a difference between an amplitude of the sum of the given value of the direct axis current and the compensation amount of the direct axis current and the amplitude of the characteristic current when the maximum torque per ampere control is operating in the d'q' coordinate system, judging a flux-weakening region of the salient pole offset permanent magnet synchronous motor, and determining an output of a compensation amount of a quadrature axis current through a PI controller when the salient pole offset permanent magnet synchronous motor works in a second flux-weakening region;

when the first flux-weakening region is operating, the quadrature axis current of the salient pole offset permanent magnet synchronous motor is given by a motor current limit circle in the d'q' coordinate system;

when the second flux-weakening region is operating, the given value of the direct axis current of the salient pole offset permanent magnet synchronous motor is the characteristic current in the d'q' coordinate system, and a given value of the quadrature axis current of the salient pole offset permanent magnet synchronous motor is a sum of the quadrature axis current at the characteristic current and the compensation amount of the quadrature axis current in the d'q' coordinate system;

through the rotation transformation of the coordinate system, rotating a current d'q' coordinate system of the salient pole offset permanent magnet synchronous motor to a corresponding angle to obtain an original dq coordinate system, and obtaining the given value of the motor current in the dq coordinate system;

according to the given value of the motor current and an obtained actual value of the current, generating a space vector pulse width modulation signal to drive an operation of the salient pole offset permanent magnet synchronous motor, and realizing a flux-weakening speed regulation of the salient pole offset permanent magnet synchronous motor in a full speed range;

a direct axis current at an intersection of the current trajectory and an abscissa axis in the d'q' coordinate system is the characteristic current $i_c$, the abscissa axis is a d' coordinate axis, and the quadrature axis current at an intersection of the current trajectory and the motor current limit circle in the d'q' coordinate system is the quadrature axis current $i_{cq}$ at the characteristic current;

according to the difference between the amplitude $|i_{d'}^{}|$ of the sum of the given value of the direct axis current and the compensation amount of the direct axis current and the amplitude $|i_c|$ of the characteristic current when the maximum torque per ampere control is operating, judging the flux-weakening region of the salient pole offset permanent magnet synchronous motor; when $|i_{d'}^{}|$ is less than or equal to $|i_c|$, the salient pole offset permanent magnet synchronous motor works in the first flux-weakening region, when $|i_{d'}^{**}|$ is greater than $|i_c|$, the salient pole offset permanent magnet synchronous motor works in the second flux-weakening region;

rotating a current dq coordinate system of the salient pole offset permanent magnet synchronous motor by a predetermined angle θ to obtain a new d'q' coordinate system, wherein the current trajectory in the d'q' coordinate system when the maximum torque per voltage control is operating is perpendicular to the abscissa axis, that is, the d' coordinate axis, obtaining the compensation amount of the direct axis current according to the difference $\Delta U$ between the limit voltage of the inverter $U_{smax}$ and the given value of the stator voltage $U_s$ by the PI controller;

obtaining the compensation amount of the quadrature axis current $i_{q'fw}^*$ according to the difference between the amplitude of the sum $i_{d'}^{**}$ of the given value of the direct axis current $i_{d'}^*$ and the compensation amount of the direct axis current $i_{d'fw}^*$ and the amplitude of the characteristic current when the maximum torque per ampere control is operating in the d'q' coordinate system by the PI controller.

2. The flux-weakening control method for the salient pole offset permanent magnet synchronous motor according to claim 1, wherein the current trajectory when the maximum torque per voltage control is operating is approximately a straight line with a slope of k.

3. The flux-weakening control method for the salient pole offset permanent magnet synchronous motor according to claim 1, wherein the given values of the current $i_d^*$, $i_q^*$ in the dq coordinate system when the maximum torque per ampere control is operating are allowed to be expressed as $i_{d'}^*$, $i_{q'}^*$ in the d'q' coordinate system after the rotation transformation of the coordinate system, that is, $$\begin{cases} i_d^* = i_{d'}^*\cos\theta + i_{q'}^*\sin\theta \\ i_q^* = -i_{d'}^*\sin\theta + i_{q'}^*\cos\theta \end{cases}$$

4. The flux-weakening control method for the salient pole offset permanent magnet synchronous motor according to claim 1, wherein when $|i_{d'}^{**}|$ is less than or equal to $|i_c|$, the salient pole offset permanent magnet synchronous motor works in the first flux-weakening region, an upper limit of the amplitude of the sum of the given value of the direct axis current $i_{d'}^*$ and the compensation amount of the direct axis current $i_{d'fw}^*$ is set as the amplitude of the characteristic current $i_c$ to obtain the given value of the direct axis current $i_{d'}^{*}$ in the first flux-weakening region, and the given value of the direct axis current $i_{d'}^{*}$ in the first flux-weakening region is allowed to be expressed as $$i_{d'}^{*} = \begin{cases} i_{d'}^{} = i_{d'}^* + i_{d'fw}^*, & |i_{d'}^{}| \le |i_c| \\ i_c, & |i_{d'}^{}| > |i_c| \end{cases};$$

when the quadrature axis current in the first flux-weakening region is given by the motor current limit circle, the given value of the quadrature axis current in the first flux-weakening region $i_{q'}^{}$ is allowed to be expressed as $$i_{q'}^{} = \begin{cases} i_{q'}^*, & i_{q'}^{*2} + i_{d'}^{*2} \le i_{s\,max}^2 \\ \sqrt{i_{s\,max}^2 - i_{d'}^{*2}}, & i_{q'}^{*2} + i_{d'}^{***2} > i_{s\,max}^2 \end{cases},$$

where $i_{smax}$ is a limit current of the salient pole offset permanent magnet synchronous motor, and $i_{q'}^*$ is the given value of the quadrature axis current when the maximum torque per ampere control is operating.

5. The flux-weakening control method for the salient pole offset permanent magnet synchronous motor according to claim 4, wherein in a full speed range, the given values $i_{q'}^{*}$ and $i_{d'}^{*}$ of the quadrature axis current and direct axis current of the salient pole offset permanent magnet synchronous motor in the d'q' coordinate system are allowed to be expressed as $$\begin{cases} i_{d'}^*, & \text{MTPA region} \\ i_{d'}^{***} = i_{d'}^* + i_{d'fw}^*, & \text{first flux-weakening region} \\ i_c, & \text{second flux-weakening region} \\ i_{q'}^*, & \text{MTPA region} \\ i_{q'}^{*} = \sqrt{i_{s\,max}^2 - i_{d'}^{*2}}, & \text{first flux-weakening region} \\ i_{q'fw}^* + i_{cq}, & \text{second flux-weakening region} \end{cases}$$

6. The flux-weakening control method for the salient pole offset permanent magnet synchronous motor according to claim 5, wherein through the rotation transformation of the coordinate system, the current d'q' coordinate system of the salient pole offset permanent magnet synchronous motor is rotated to a corresponding angle $-\theta$ to obtain the original dq coordinate system, and the $i_{q'}^{*}$ and $i_{d'}^{*}$ are transformed into the given values of the quadrature axis current $i_q^{}$ and direct axis current $i_d^{}$ in the dq coordinate system, that is $$\begin{cases} i_d^{} = i_{d'}^{*}\cos(-\theta) + i_{q'}^{*}\sin(-\theta) \\ i_q^{} = -i_{d'}^{*}\sin(-\theta) + i_{q'}^{*}\cos(-\theta) \end{cases}$$

7. A flux-weakening control system for the salient pole offset permanent magnet synchronous motor based on the flux-weakening control method for the salient pole offset permanent magnet synchronous motor according to any one of claims 1-6, comprising:

an electromagnetic torque given module, wherein the electromagnetic torque given module is configured to obtain a real-time speed of the salient pole offset permanent magnet synchronous motor, combined with a given speed of the salient pole offset permanent magnet synchronous motor, the given value of the electromagnetic torque of the salient pole offset permanent magnet synchronous motor is obtained;

a maximum torque per ampere control module, wherein the maximum torque per ampere control module is configured to calculate the given values of the quadrature axis current and direct axis current of the salient pole offset permanent magnet synchronous motor when the maximum torque per ampere control is operating according to the electromagnetic torque equation and the given value of the electromagnetic torque;

a dq coordinate system-d'q' coordinate system transformation module, wherein the dq coordinate system-d'q' coordinate system transformation module is configured to transform the given value of the current in the dq coordinate system into the given value of the current in the d'q' coordinate system;

a maximum torque per voltage control module, wherein the maximum torque per voltage control module is configured to calculate the current trajectory of the salient pole offset permanent magnet synchronous motor when the maximum torque per voltage control is operating according to the stator voltage equation, according to a calculation result of the dq coordinate system-d'q' coordinate system transformation module and the current trajectory when the maximum torque per voltage control is operating, the characteristic current and the quadrature axis current at the characteristic current are obtained;

a direct axis current compensation module, wherein the direct axis current compensation module is configured to determine whether the flux-weakening control needs to be turned on according to the difference between the limit voltage of the inverter and the given value of the stator voltage, and output the compensation amount of the direct axis current when the flux-weakening control is turned on, according to the calculation result of the dq coordinate system-d'q' coordinate system transformation module and the compensation amount of the direct axis current, the given value of the current of the salient pole offset permanent magnet synchronous motor operating in the first flux-weakening region is calculated;

a quadrature axis current compensation module, wherein the quadrature axis current compensation module is configured to determine whether it is necessary to turn on the second flux-weakening region according to the difference between the amplitude of the sum of the given value of the direct axis current and the compensation amount of the direct axis current and the amplitude of the characteristic current when the maximum torque per ampere control is operating, and output the compensation amount of the quadrature axis current when turning on, according to a calculation result of the direct axis current compensation module, the quadrature axis current at the characteristic current and the compensation amount of the quadrature axis current, the given value of the current of the salient pole offset permanent magnet synchronous motor operating in the second flux-weakening region is calculated;

a d'q' coordinate system-dq coordinate system transformation module, wherein the d'q' coordinate system-dq coordinate system transformation module is configured to transform the given value of the current in the d'q' coordinate system into the given value of the current in the dq coordinate system;

a space vector pulse width modulation module, wherein the space vector pulse width modulation module is configured to generate the space vector pulse width modulation signal according to the given value of the motor current and the obtained actual value of the current, the space vector pulse width modulation module is configured to drive the operation of the salient pole offset permanent magnet synchronous motor, complete the flux-weakening control of the salient pole offset permanent magnet synchronous motor, and realize the flux-weakening speed regulation of the salient pole offset permanent magnet synchronous motor in the full speed range.

* * * * *